United States Patent Office 2,857,401
Patented Oct. 21, 1958

2,857,401
ACETYLATED COUMARIN DERIVATIVES

Kurt J. Rorig, Glenview, Ill., assignor to G. D. Searle & Co., Chicago, Ill., a corporation of Delaware No Drawing. Application December 20, 1956
Serial No. 629,492

5 Claims. (Cl. 260—343.2)

This invention relates to 8-acetyl-4-alkyl-7-hydroxy-3-(p-hydroxyphenyl)coumarins and corresponding ethers. More particularly, this invention relates to compounds of the structural formula

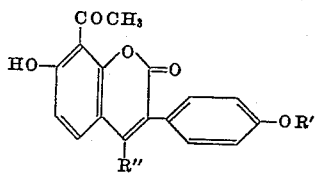

wherein each of R' and R" represent either hydrogen or an alkyl radical, and among alkyl radicals, so-called "lower" alkyl groupings are preferred. Examples of the lower alkyl radicals especially contemplated are methyl, ethyl, propyl, isopropyl, butyl, isobutyl, sec-butyl, tert-butyl, pentyl, isopentyl, tert-pentyl, neopentyl, hexyl, isohexyl, heptyl, octyl and like $C_nH_{2n+1}$ groupings wherein $n$ is a positive integer amounting to less than 9.

The compounds to which this invention relates are useful because of their valuable pharmacological properties. Specifically, the claimed compositions manifest desirable antibiotic activity: they block the spread of Coxsackie virus in cortisone-treated mammals. At the same time, the subject compounds are characterized by a commendably low order of estrogenic potency.

The ethers of the present invention are preparable via the condensation of 2,6-dihydroxyacetophenone with an appropriate β-oxonitrile in the presence of concentrated sulfuric acid. The phenols of this invention, in turn, are obtained upon treatment of a corresponding ether with aluminum bromide in benzene.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted. "v./v." is the abbreviation used to designate volume by volume.

Example 1

8 - acetyl - 7 - hydroxy - 3 - (p-methoxyphenyl) - 4-methyl-coumarin.—Approximately 19 parts of α-anisylacetoacetonitrile is intimately combined with 15 parts of 2,6-dihydroxyacetophenone during the 30-minute addition of 55 parts of concentrated sulfuric acid at 0–10° C. The brown-yellow paste which forms is maintained for an additional 20 minutes at the specified temperatures, in the course of which time gelation occurs. The gel obtained is let stand at room temperatures for 24 hours, becoming blood red in color and much more fluid than originally. At this point, the material is poured into 270 parts of water to which is then added approximately 200 parts of aqueous 10% (v./v.) sulfuric acid. The resultant mixture is heated at the boiling point under reflux for 1 hour. From the black oil which forms, the supernatant aqueous acid is removed by decantation. The oil is washed with water and then taken up in approximately 80 parts of absolute ethanol at the boiling point. On cooling, there is thrown down 8-acetyl-7-hydroxy-3-(p-methoxyphenyl)-4-methylcoumarin as a light tan, granular solid melting at 189–191° C. Additional crops of material are recoverable from the mother liquor on evaporation. Recrystallization from ethyl acetate affords the product as broad needles or blades, yellow-white in color, melting at 190–191° C. The product has the formula

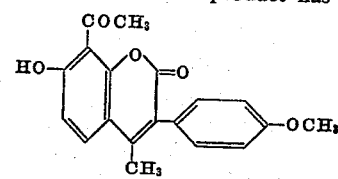

Example 2

8 - acetyl - 7 - hydroxy - 3 - (p - hydroxyphenyl) - 4-methylcoumarin.—To a solution of 15 parts of aluminum bromide in approximately 450 parts of thiophene-free benzene at 50° C. under an atmosphere of nitrogen is added, with vigorous agitation and during a 10-minute period, 4 parts of 8-acetyl-7-hydroxy - 3 - (p-methoxyphenyl)-4-methylcoumarin dissolved in 110 parts of warm thiophene-free benzene. The reactants are heated at the boiling point under reflux for 40 minutes, at the end of which time the yellow-brown precipitate present is decomposed by addition of a mixture of 120 parts of concentrated muriatic acid and 200 parts of water. The product thus obtained is extracted with ethyl acetate. The extract is dried over anhydrous calcium sulfate, following which solvent is removed by evaporation. The yellow and brown crystals remaining as a residue are recrystallized from absolute ethanol to give yellow-white 8-acetyl-7-hydroxy - 3 - (p- hydroxyphenyl) - 4 - methylcoumarin melting at 227–229° C., with slight previous softening. The product has the formula

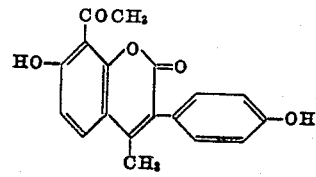

Example 3

8 - acetyl - 4 - ethyl - 7 - hydroxy - 3 - (p - methoxyphenyl)-coumarin.—Approximately 40 parts of α-anisylpropionylacetonitrile is intimately combined with 30 parts of 2,6-dihydroxyacetophenone during the addition of 90 parts of concentrated sulfuric acid over a 20 minute period, temperatures being maintained in the range 0–10° C. the while. Cooling is continued for one-half hour after the addition of sulfuric acid is completed, following which the reactants are let stand at room temperatures for 24 hours. At this point the reaction mixture is dark red in color and contains a substantial amount of insoluble white crystalline matter. An additional 45 parts of concentrated sulfuric acid is introduced, whereupon the mixture is let stand four more days at room temperatures. During this time, precautions are taken to preserve anhydrous conditions. The reactants are then diluted with approximately 700 parts of water, and the mixture thus obtained is heated at the boiling point under reflux for 1½ hours. A semi-mobile black oil forms in process. The oil is separated by decantation and taken up in ethyl acetate. The resultant extract is dried over anhydrous calcium sulfate and filtered. From the filtrate, there is thrown down a tan powder, M. P. 238–240° C. (dec.), which is separated and discarded. The mother liquor is evaporated to dryness and the residue therefrom taken up in benzene for chromatography on silica gel, using benzene and ethyl acetate as developing solvents. From the eluate comprising 2% ethyl acetate and 98% benzene (v./v.), there is obtained a fraction which, twice recrystallized from absolute ethanol, yields yellow blades of pure 8-acetyl-4-ethyl-7-hydroxy-3-(p-methoxyphenyl) coumarin, melting at 144–146° C. The product has the formula

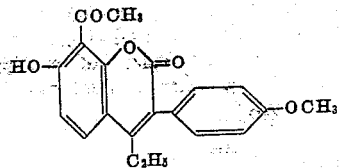

*Example 4*

8 - acetyl - 4 - ethyl - 7 - hydroxy - 3 - (p - hydroxyphenyl)-coumarin.—To a solution of 24 parts of anhydrous aluminum bromide in 540 parts of dry thiophene-free benzene is added, with vigorous agitation at 60° C. under an atmosphere of nitrogen and during 15 minutes, 6 parts of 8 - acetyl - 4 - ethyl - 7 - hydroxy - 3 - (p-methoxyphenyl)coumarin. The mixture is then heated at the boiling point under reflux for 40 minutes, following which agitation is continued for one-half hour at room temperatures. The resultant product is then dumped into a mixture of 125 parts of water and 90 parts of concentrated muriatic acid. The light yellow, crystalline product which precipitates is filtered off and successively washed with water and benzene. The material thus obtained is 8-acetyl-4-ethyl-7-hydroxy - 3 - (p - hydroxyphenyl)coumarin, melting at 225–228° C. Recrystallization from absolute ethanol does not substantially alter this melting point. The product has the formula

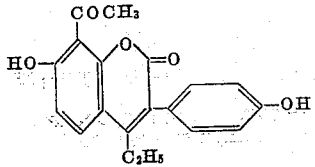

What is claimed is:
1. A compound of the formula

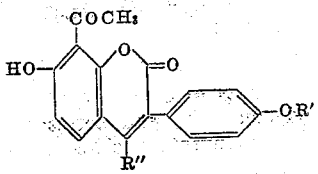

wherein R′ is selected from the group consisting of hydrogen and lower alkyl radicals, and R″ is a lower alkyl radical.

2. 8 - acetyl - 7 - hydroxy - 3 - (p-methoxyphenyl)-4-methylcoumarin.
3. 8 - acetyl - 7 - hydroxy - 3 - (p-hydroxyphenyl)-4-methylcoumarin.
4. 8 - acetyl - 4 - ethyl - 7 - hydroxy - 3 - (p-methoxyphenyl)coumarin.
5. 8 - acetyl - 4 - ethyl - 7 - hydroxy - 3 - (p-hydroxyphenyl)coumarin.

References Cited in the file of this patent

Shah et al.: J. Chem. Soc., 1424 (1938).
Mentzer et al.: Bull. Soc. Chem. de France 13, 271–6 (1946).